July 10, 1956 G. R. DOHRMANN 2,754,411
REMOTE CONTROL SPOTLIGHT
Filed March 23, 1954 3 Sheets-Sheet 1
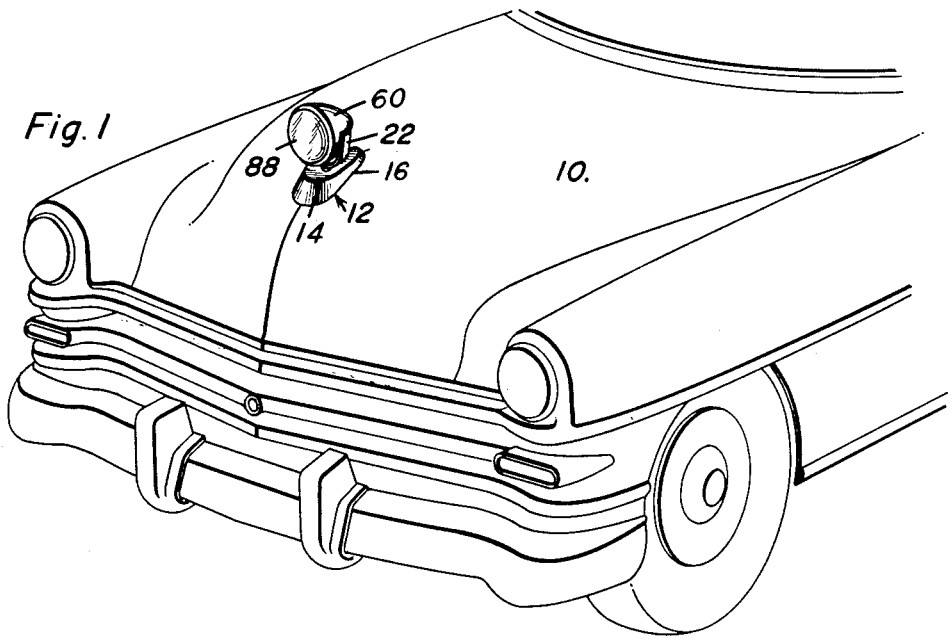
Fig. 1
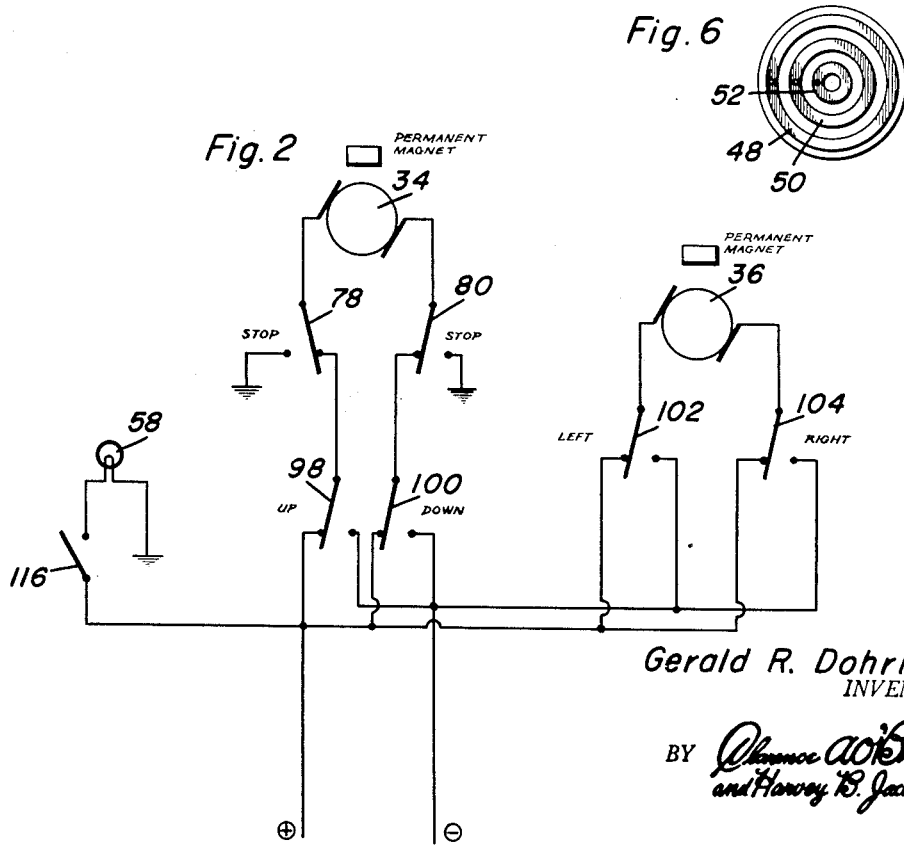
Gerald R. Dohrmann
INVENTOR.
BY *Clarence A. O'Brien*
*and Harvey B. Jackson*
Attorneys July 10, 1956  G. R. DOHRMANN  2,754,411
REMOTE CONTROL SPOTLIGHT
Filed March 23, 1954  3 Sheets-Sheet 2

Gerald R. Dohrmann
INVENTOR.

BY Clarence A. O'Brien
and Harvey B. Jacobson
Attorneys

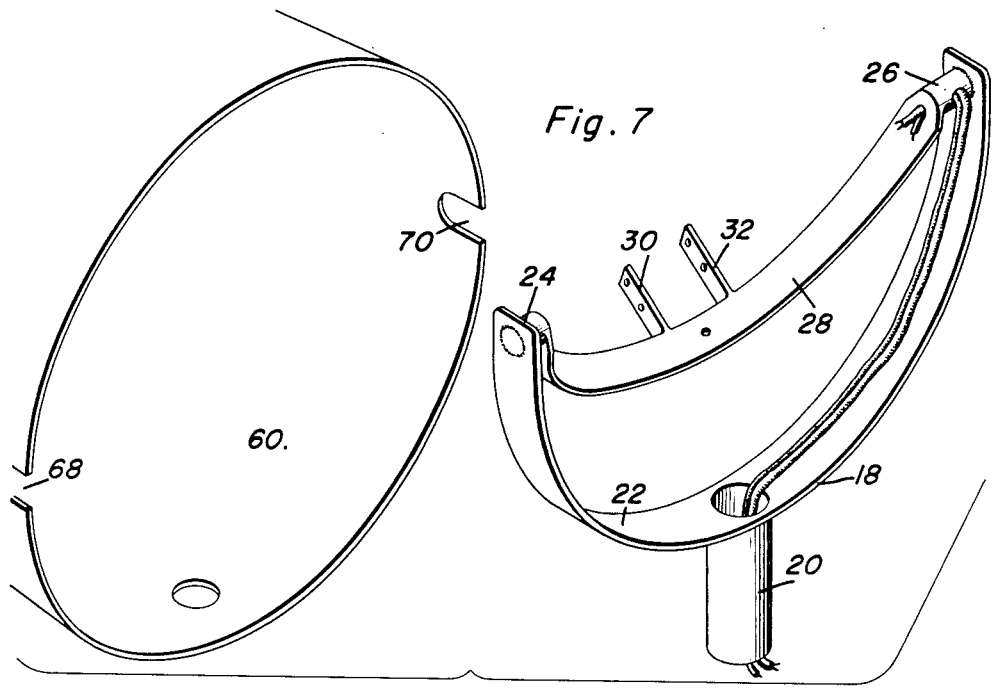
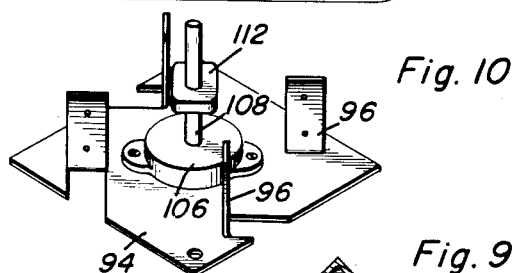
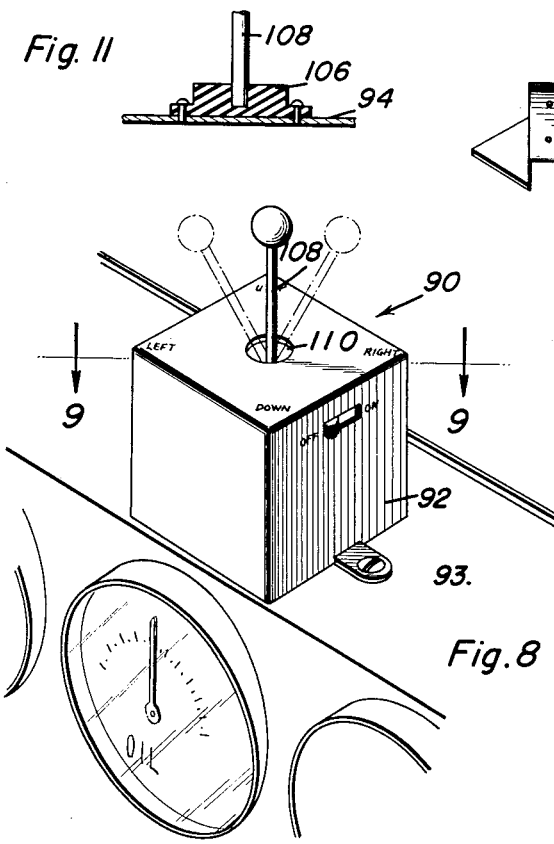
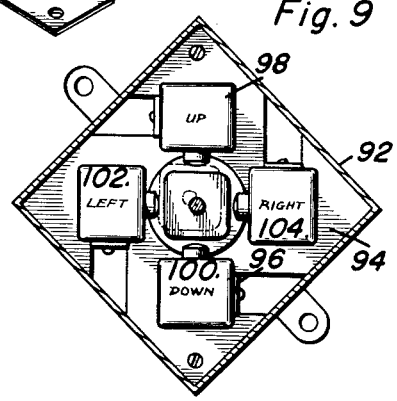
July 10, 1956   G. R. DOHRMANN   2,754,411
REMOTE CONTROL SPOTLIGHT
Filed March 23, 1954   3 Sheets-Sheet 3
Gerald R. Dohrmann
INVENTOR.

United States Patent Office 2,754,411
Patented July 10, 1956

2,754,411

REMOTE CONTROL SPOTLIGHT

Gerald R. Dohrmann, Hampton, Iowa, assignor of one-fourth to Otto Dohrmann, Hampton, Iowa Application March 23, 1954, Serial No. 418,080

1 Claim. (Cl. 240—61.9)

This invention relates to an automobile accessory, and more particularly to a hood-mounted remote controlled rotatable and tiltable spotlight.

The primary object of the present invention resides in the provision of a highly attractive yet remote controlled spotlight which is capable of being mounted on the hood or like portion of an automotive vehicle and which may be rotated through 360 degrees while being capable of being simultaneously elevated or depressed, as may be desired.

One of the particular features of the invention resides in the provision of means for mounting the spotlight so that it may be rotated through 360 degrees while being simultaneously capable of being elevated and depressed.

Incorporated in the concept of the present invention is a casing having the means for elevating and depressing the spotlight mounted therein so that such mechanism which by its very design must be unattractive, is encased so as to be invisible thereby enabling the device to provide a highly attractive appearance while performing the functions of a hood ornament as well as that of a spotlight thereby providing a great asset to night driving.

A further object of this present invention resides in the provision of a nose-mounted spotlight which may be rotated so that the driver can see the condition of a road which curves away from the direction in which the vehicle is traveling since the headlights of the vehicle normally shine only along the path that the vehicle is traveling.

A further important object of the present invention resides in the provision of a control mechanism for use in combination with this spotlight so that the spotlight may be elevated and depressed simultaneously with its rotation, as may be desired.

Still further objects and features of this invention reside in the provision of a remote control spotlight that is strong and durable, simple in construction and manufacture, capable of being readily installed on various existing makes and models of automotive vehicles, while being also adapted for use in newly constructed vehicles, which is highly attractive in appearance and yet which is comparatively inexpensive to produce.

These, together with the various ancillary objects and features of the invention which will become apparent as the following description proceeds, are attained by this remote control spotlight, a preferred embodiment of which has been illustrated in the accompanying drawings, by way of example only, wherein:

Figure 1 is a perspective view illustrating the remote control spotlight as operatively installed on the hood of a vehicle;

Figure 2 is an electrical schematic diagram illustrating the control circuit of the invention;

Figure 6 is an enlarged sectional detailed view as taken along the plane of line 6—6 in Figure 3, illustrating the means utilized for delivering electrical current to the means for elevating and depressing the spotlight even though the spotlight is rotatably mounted;

Figure 7 is an enlarged perspective view of the support comprising one of the important elements of the invention as associated with the casing;

Figure 8 is a perspective view of the control device which may be mounted on the dashboard, instrument panel, or other suitable portion of the vehicle;

Figure 9 is a horizontal sectional view as taken along the plane of line 9—9 in Figure 8;

Figure 10 is a perspective view of the mounting plate comprising one of the important elements of the control device; and Figure 11 is a sectional detailed view of the means utilized for mounting the operating lever of the control device.

Figure 3:
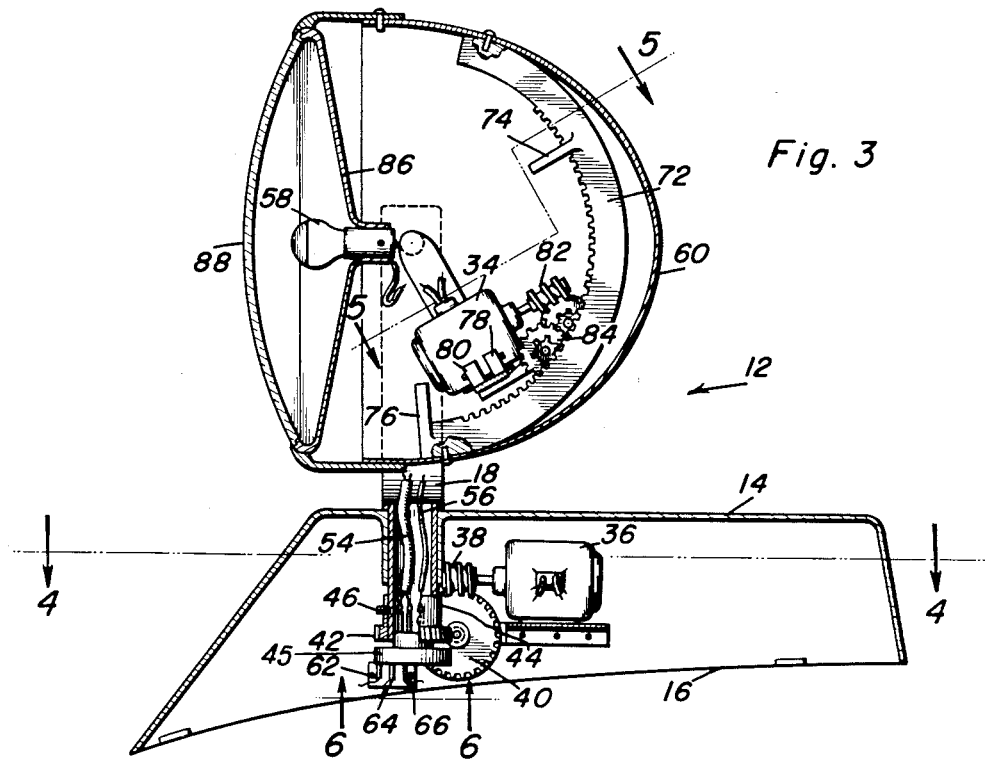
Figure 3 is an enlarged vertical sectional view illustrating the construction of the device comprising the present invention.
Figure 4:
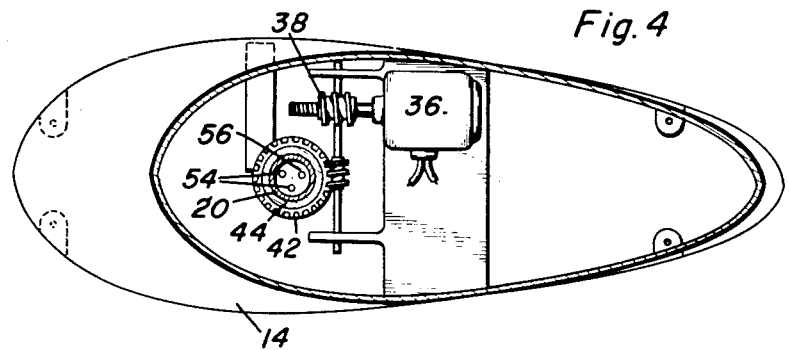
Figure 4 is a horizontal sectional view as taken along the plane of line 4—4 in Figure 3.
Figure 5:
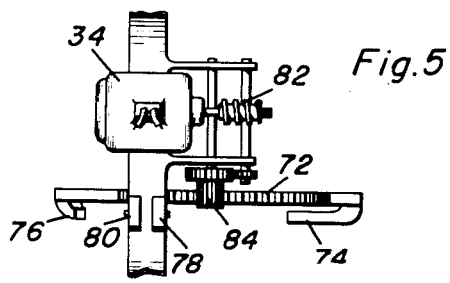
Figure 5 is a sectional detailed view as taken along the plane of line 5—5 of Figure 3.

With continuing reference to the accompanying drawings wherein like reference numerals designate similar parts throughout the various views, reference numeral 10 generally designates any conventional make or model of automotive vehicle having the device comprising the present invention operatively installed thereon which is generally designated by reference numeral 12. This remote control spotlight 12 includes a housing 14 having its bottom edges as at 16 contoured to conform to the configuration of the hood of the vehicle 10 and which is adapted to be secured by any suitable means to the hood 10. The housing 14 has journaled therein a support member 18 having a downwardly extending cylindrical portion 20 which is hollow and which has preferably integrally formed or else attached thereto an arcuate yoke 22 carrying stub axles 24 and 26 to which a support bar 28 is affixed. The support bar 28 carries mounting brackets 30 and 32 which support a motor 34.

Mounting within the housing 14 is a motor 36 which drives a gear 38 which, in turn, drives a gear 40 to rotate a gear 42 having a sleeve 44 which is secured to the tubular portion 20 of the support 18 by means of set screw 46 or any other suitable means.

The tubular portion 20 has a member 45 of insulative material secured thereto which carries electrically conductive commutator rings 48, 50, and 52, to two of which the control leads 54 are attached for controlling the direction of operation of the motor 34. It is to be noted that the conductor 56 is connected to the commutator ring 52 and is provided for supplying power to the lamp 58 mounted within casing 60. The commutator rings 48, 50 and 52, are adapted to be engaged by brushes 62, 64 and 66, to which the leads from the control mechanism are attached.

The casing 60 has a pair of recesses 68 and 70 therein, which are adapted to be positioned over the stub axles 24 and 26. Additionally, the casing 60 has an arcuate gear rack 72 mounted therein having stop elements 74 and 76 either integrally cast or otherwise attached thereto which are adapted to be engaged by micro-switches 78 and 80, respectively, which may be affixed to the motor 34 or carried by the support bar 28, as a matter of design. The motor 34 drives a gear 82 which, in turn, through a set of reduction gears 84, causes movement of the casing 60 relative to the rigidly fixed motor 34 and gear 82. This will cause the elevation or depression of the casing 60. Also mounted within the casing is a reflector 86 as well as a lens 88 for the lamp 58.

The control device for providing means for elevating and depressing the spotlight 12 as well as for rotating it, is generally designated by reference numeral 90, and includes a housing 92 having a mounting plate 94 therein. The housing 92 may be affixed to the instrument panel 93 or other portion of the vehicle 10. The mounting plate 94 is provided with a plurality of support members 96 which are upwardly struck from the mounting plate 94 utilizing slots in the mounting plate 94 which extend angularly with respect to the sides of the mounting plate 94 and which are of unequal length thereby enabling the support of the micro-switches 98, 100, and 102, 104, in pairs. The mounting plate 94 has a resilient element 106 attached thereto, which forms a socket for swively receiving an operating lever 108, which extends upwardly through an aperture 110 in the casing 92, and since the operating lever 108 carries a substantially square contact plate 112, the operating lever 108 is adapted to enable the control of the spotlight by the closing of any single one of the micro-switches 98, 100, 102 and 104, or one of each of the pairs of micro-switches 98 and 100, and 102, 104, respectively. Hence, if it is desired to elevate the spotlight 12 while rotating it to the left, it is merely necessary to move the operating lever forwardly and to the left, which would then cause the micro-switches 98 and 102 to be depressed. Likewise, movement to the right and forward would cause the rotation of the spotlight 12 to the right while elevating it.

It is to be noted that when the spotlight has been elevated to the extent that the micro-switch 78 becomes depressed, the circuit will be broken and the elevating action will cease. Likewise, when the micro-switch 80 becomes depressed, the spotlight 12 will cease being depressed.

A control switch 116 may be mounted on the housing 92 for connecting the lamp 58 to a source of electrical power.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A spotlight comprising a support adapted to be rotatably mounted on a vehicle, means for rotating said support, a lamp casing, said lamp casing being pivotally mounted on said support, said support including a yoke, a pair of stub axles rigidly secured to said yoke, said stub axles being carried by a support bar, said casing being pivotally received on said stub axles, said lamp casing having an arcuate gear rack fixedly mounted therein, a motor fixedly carried by said support bar within said casing, said motor driving a drive gear engaging said gear rack for elevating and depressing said lamp casing.

References Cited in the file of this patent

UNITED STATES PATENTS

| | | |
|---|---|---|
| 1,257,141 | Snowdon | Feb. 19, 1918 |
| 1,491,930 | Smith | Apr. 29, 1924 |
| 1,827,797 | Muller | Oct. 20, 1931 |
| 2,397,978 | Paulus et al. | Apr. 9, 1946 |
| 2,507,016 | Hesh | May 9, 1950 |

FOREIGN PATENTS

| | | |
|---|---|---|
| 625,770 | Germany | Feb. 14, 1936 |
| 1,000,676 | France | Oct. 17, 1951 |